July 1, 1958     K. E. RICHTER     2,841,687
METHOD OF APPLYING HARD-FACING METALS
Filed Feb. 18, 1954
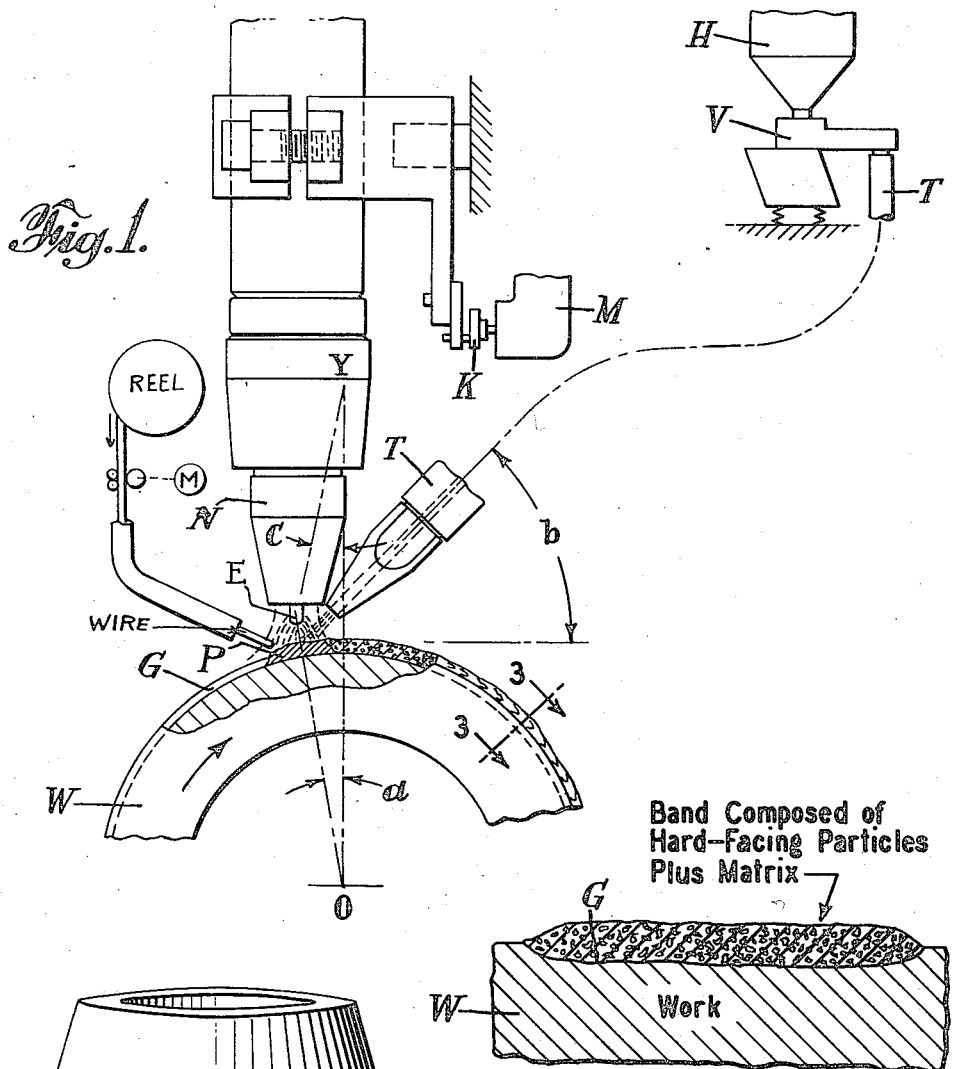
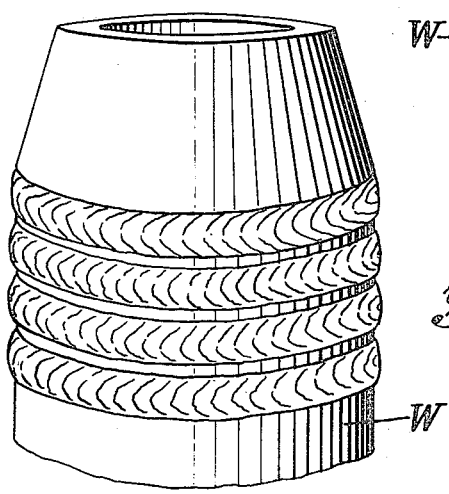
INVENTOR
KENNETH E. RICHTER

2,841,687
METHOD OF APPLYING HARD-FACING METALS

Kenneth E. Richter, Morristown, N. J., assignor to Union Carbide Corporation, a corporation of New York Application February 18, 1954, Serial No. 411,184

10 Claims. (Cl. 219—76)

This invention relates to method of applying hard-facing materials and metals, and more particularly for use on surfaces of drilling tools and the like, employing the abrasion-resistant properties of hard metal carbide particles to provide a wear-resistant surface.

It is desirable to add the hard-facing metal or material to the base metal in the form of a band, the carbide particles being added to the fused base metal. The distribution of these particles has been non-uniform, with the result that an excessive amount of the carbide particles has been dissolved and settled to the bottom of the weld puddle, so that the abrasion-resistant properties of the particles have been lost.

In order to avoid excessive increase in diameter, premachined grooves have been provided when necessary to receive the hard-facing materials. The depth of penetration of fusion into the base metal, the height of build up of the hard-facing deposit, the even distribution of particles and the tendency to undercut have been difficult to control, and it has been necessary to employ expensive voltage control equipment for this method. Only relatively narrow bands could be produced by single pass operation.

The objects of the present invention are to avoid the difficulties referred to above, to provide uniform distribution of the carbide particles throughout the area of the band, to increase the width of the band, to control the depth of penetration of fusion into the base metal, to control the height of build up of the hard-facing material, to minimize undercutting, and avoid the necessity of voltage control equipment.

According to the present invention, an arc is struck between the metal workpiece connected to a source of welding current and an electrode connected to said source, to form thereon a weld puddle, the arc and weld puddle are shielded with a stream containing inert gas, and a stream of hard-facing material particles is projected through the shielding gas into the molten weld puddle. The arc, weld puddle, shielding gas and stream of hard-facing particles are progressed simultaneously along a line of weld on said metal workpiece. Preferably the ratio of welding current density to rate of feed of metal carbide particles is controlled to avoid excessive fusion of said particles. The electrode is preferably maintained at an angle of from zero to fifteen degrees to the normal to the surface of the workpiece. With a rotating workpiece, the tip of the electrode is preferably angularly displaced ahead of the vertical radius for an angle of from zero to twenty degrees. The stream of metal carbide particles is preferably at an angle of 40° to 80° to the surface of the workpiece. The stream of metal carbide particles is preferably oscillated transversely with respect to the line of weld, to distribute said particles uniformly into the weld puddle and to increase the width of the band deposited, the frequency of oscillation being preferably from 40 to 120 cycles per minute. The base metal is preferably preheated to a temperature of 600° F. to avoid or minimize cracking of the base metal.

In the drawings:

Fig. 1 is a diagram of apparatus for carrying out the method according to the preferred embodiment of the present invention;

Fig. 2 is a perspective view of a workpiece which has been hard faced by the apparatus of Fig. 1; and Fig. 3 is a section taken along the line 3—3 of Fig. 1.

In the example shown, the workpiece W is a section of oil well tool joint which has been premachined to provide grooves G to receive the hard-facing material, and suitably mounted in a turning fixture or the like to turn the workpiece direction of the arrow shown. An arc is struck between an electrode E and the base metal at the bottom of the groove G to form a weld puddle P, and the arc and weld puddle are shielded by a stream containing inert gas such as helium or argon supplied through a nozzle N.

Refractory hard metal carbide particles are supplied by a hopper H through a vibrator dispenser V into a flexible tube T which projects a stream of such particles through the shielding gas into the molten weld puddle P. The electrode E, nozzle N and the tube T are oscillated by an eccentric K driven by a motor M at a frequency of preferably 40 to 120 cycles per minute. The tube T is preferably at an angle $b$ of 40° to 80° to the surface of the workpiece.

As shown in Fig. 1, the line O—Y is a vertical centerline passing through the center O of the circular workpiece. The angle $c$ is formed between said vertical centerline O—Y and the axis of the electrode. The optimum range of the angle $c$ is from zero to fifteen degrees.

The designation $a$ indicates an angle measurement to locate the tip of the electrode forward of the vertical centerline O—Y. The magnitude of the angle $a$ varies with the diameter and speed of the workpiece W. For a workpiece of six inch diameter, the angle $a$ varies from zero degree to twenty degrees, being a function of the rotational speed of the workpiece.

The band contour can be importantly controlled by the favorable positioning of the electrode to the workpiece, this control being obtained by the desirable combination of angles $a$ and $c$.

The electrode E is preferably non-consumable, for example tungsten, preferably thoriated, and preferably pointed, which melts to a geometry which allows maximum current density at the point of discharge to thereby eliminate wandering of the arc, and reduce undercutting at the weld edges.

The current may be alternating current with superimposed high frequency, or direct current straight polarity. For a given amplitude of oscillation, the hard-faced band produced using ACHF is wider than that produced using DCSP. The tendency to undercut using DCSP is eliminated using ACHF. The band build up and depth of penetration is reduced using ACHF over that using DCSP. Tungsten electrode consumption is greater using ACHF. Best overall results show preference for DCSP with a pointed thoriated tungsten electrode.

Hard-facing bands were satisfactorily produced employing a machined groove ½ inch wide and 1/32 inch deep. Welding speeds of 9 through 11 inches per minute were obtained using 300 to 475 amperes, a 15 volt arc using argon as the shielding gas, and a 600° F. preheat. With helium the voltage would be somewhat higher. The bands produced were from ⅝ to ¾ inch wide. The particle sizes were 20/30, 30/40, 40/60, and 40/100, dispensing from 45 to 90 grams per minute. Using ACHF bands approximately one inch wide were made.

The tendency to cracking in the band matrix may be reduced by feeding low-carbon steel or iron into the weld puddle. This may be done by feeding the ferrous metal particles separately or premixed with the crushed tungsten carbide particles, or by feeding a ferrous metal wire R into the leading edge of the puddle P.

I claim:

1. Method of hard facing a metal workpiece to form thereon a wear-resistant band, which comprises striking an arc between a non-consumable electrode and the bottom of a premachined groove forming a band matrix to form therein a weld puddle, shielding the arc and weld puddle with a stream containing inert gas, projecting a stream of hard-facing particles through the shielding gas into said weld puddle, progressing the arc, weld puddle, shielding gas and stream of hard-facing particles simultaneously along a line of weld on said metal workpiece, simultaneously oscillating said non-consumable electrode and said stream of hard facing particles transversely with respect to said line of weld to spread the heat of the arc and to distribute said particles uniformly throughout the weld puddle, and feeding low carbon ferrous metal into the leading edge of the weld puddle in said groove to further reduce the tendency to cracking in the band matrix below the bottom of said groove.

2. Method of hard facing a metal workpiece to form thereon a wear-resistant band, which comprises striking an arc between a non-consumable electrode and the bottom of a premachined groove forming a band matrix to form therein a weld puddle, shielding the arc and weld puddle with a stream containing inert gas, projecting a stream of hard-facing particles through the shielding gas into said weld puddle, progressing the arc, weld puddle and stream of hard-facing particles simultaneously along a line of weld on said metal workpiece, simultaneously oscillating said non-consumable electrode and said stream of hard-facing particles transversely with respect to said line of weld to spread the heat of the arc and to distribute said particles uniformly throughout the weld puddle, feeding a low carbon ferrous metal wire into the leading edge of the weld puddle in said groove to reduce the tendency to cracking in the band matrix below the bottom of said groove, and controlling the ratio of welding current density to rate of feed of hard-facing particles to obtain desired ratio of band matrix to particles.

3. Method of hard facing a metal workpiece to form thereon a wear resistant band, which comprises premachining a groove in said workpiece to form a band matrix, preheating said grooved workpiece to reduce the tendency to cracking in said band matrix below the bottom of the groove, striking an arc between a non-consumable electrode and the preheated bottom of said groove to form therein a weld puddle, shielding the arc and weld puddle with a stream containing inert gas, projecting a stream of hard-facing particles through the shielding gas into said weld puddle at an angle of 40° to 80° to the surface of the workpiece, progressing the arc, weld puddle, shielding gas and stream of hard-facing particles simultaneously along a line of weld on said metal workpiece, progressing the arc, weld puddle, shielding gas and stream of hard-facing particles simultaneously along said groove, simultaneously oscillating said non-consumable electrode and said stream of hard-facing particles transversely with respect to said line of weld to spread the heat of the arc and to distribute said particles uniformly throughout the weld puddle, and feeding low carbon ferrous metal into the leading edge of the weld puddle in said groove to further reduce the tendency to cracking in the band matrix below the bottom of said groove.

4. Method of hard facing a metal workpiece to form thereon a wear-resistant surface, which comprises striking an arc between a non-consumable electrode and the metal workpiece to form thereon a weld puddle, shielding the arc and weld puddle with a stream containing inert gas, projecting a stream of metal carbide particles through the shielding gas into the weld puddle, progressing the arc, weld puddle, shielding gas and stream of refractory metal carbide particles simultaneously along a line of weld on said metal workpiece, and simultaneously oscillating said non-consumable electrode and said stream of metal carbide particles transversely with respect to said line of weld to spread the heat of the arc and to distribute said particles uniformly throughout the weld puddle.

5. Method of hard facing a metal workpiece to form thereon a wear-resistant surface, which comprises striking an arc between a non-consumable electrode and the metal workpiece to form thereon a weld puddle, shielding the arc and weld puddle with a stream containing inert gas, projecting a stream of hard-facing particles through the shielding gas into the weld puddle, progressing the arc, weld puddle, shielding gas and stream of hard-facing particles simultaneously along a line of weld on said metal workpiece, and simultaneously oscillating said non-consumable electrode and said stream of hard-facing particles transversely with respect to said line of weld with a frequency of forty to one hundred and twenty cycles per minute.

6. Method of hard facing metal to form a wear-resistant surface, which comprises preheating a workpiece to a temperature of the order of 600° F. to avoid or minimize cracking of the base metal, striking an arc between a non-consumable electrode and the bottom of a premachined groove in said preheated workpiece to form thereon a weld puddle, shielding the arc and weld puddle with a stream containing inert gas, projecting a stream of hard-facing particles through the shielding gas into said weld puddle, progressing the arc, weld puddle, shielding gas, and a stream of hard-facing particles simultaneously along said groove in said preheated metal workpiece to fill said groove and form a wear-resistant band on the workpiece simultaneously oscillating said non-consumable electrode and said stream of hard-facing carbide particles transversely with respect to said groove to spread the heat of the arc and to distribute said particles uniformly throughout the weld puddle.

7. Method of hard facing a metal workpiece having a surface of revolution to form thereon a wear-resistant surface, which comprises striking an arc between said workpiece connected to a source of welding current and a non-consumable electrode connected to said source to form a weld puddle, maintaining the axis of said electrode at an angle of from zero to fifteen degrees to a radius of said surface of revolution, shielding the arc and weld puddle with a stream containing inert gas, projecting a stream of hard-facing particles through the shielding gas into said weld puddle, rotating the workpiece with respect to the arc, welding puddle, shielding gas stream, and stream of hard-facing particles, and simultaneously oscillating said non-consumable electrode and said stream of hard-facing particles in a path substantially parallel to the axis of rotation of said workpiece to distribute said particles uniformly throughout the weld puddle.

8. Method of hard facing a metal workpiece having a surface of revolution to form thereon a wear-resistant surface, which comprises striking an arc between said workpiece connected to a source of welding current and a non-consumable electrode connected to said source, shielding the arc and weld puddle with a stream containing inert gas, projecting a stream of hard-facing particles through the shielding gas into said well puddle, rotating the workpiece with respect to the arc, welding puddle, shielding gas stream, and stream of hard-facing particles, maintaining the tip of said electrode angularly displaced ahead of the vertical radius of said surface of revolution from zero to twenty degrees, and simultaneously oscillating said non-consumable electrode and stream of hard-facing particles substantially parallel to the axis of said workpiece to distribute said particles uniformly throughout the weld puddle.

9. Method of hard-facing a metal workpiece having a surface of revolution to form thereon a wear-resistant surface, which comprises striking an arc between said workpiece connected to a source of welding current and a non-consumable electrode connected to said source to form a weld puddle, maintaining the axis of said electrode at an angle of from zero to fifteen degrees to a radius of said surface of revolution, shielding the arc and weld puddle with a stream containing inert gas, projecting a stream of hard-facing particles through the shielding gas into the weld puddle, rotating the workpiece with respect to the arc, welding puddle, shielding gas stream, and stream of hard-facing particles, maintaining the tip of said electrode angularly displaced ahead of the vertical radius of said surface of revolution from zero to twenty degrees, and simultaneously oscillating said non-consumable electrode and said stream of hard-facing particles transversely with respect to the line of weld with a frequency of from forty to one hundred and twenty cycles per minute.

10. Method of hard facing a metal workpiece to form thereon a wear-resistant surface, which comprises striking an arc between a non-consumable electrode and the metal workpiece to form thereon a weld puddle, shielding the arc and weld puddle with a stream containing inert gas, subjecting a supply of hard-facing particles in powder-like form to vibration, passing said vibrated particles along a flexible conduit in which said particles flow with movement of one relative to another, projecting a stream of hard-facing particles from said conduit through the shielding gas into said weld puddle, progressing the arc, weld puddle, shielding gas and stream of hard-facing particles simultaneously along a line of weld on said metal workpiece, and simultaneously oscillating said non-consumable electrode, said stream containing inert gas, and said stream of hard-facing particles, all transversely with respect to said line of weld to distribute said particles uniformly throughout the weld puddle.

References Cited in the file of this patent

UNITED STATES PATENTS

| | | |
|---|---|---|
| 1,298,590 | Smith | Mar. 25, 1919 |
| 1,757,601 | Stoody | May 6, 1930 |
| 1,803,875 | Stoody | May 5, 1931 |
| 1,933,340 | Raymond | Oct. 31, 1933 |
| 2,189,595 | Smith | Feb. 6, 1940 |
| 2,277,654 | Merlub-Sobel et al. | Mar. 24, 1942 |
| 2,318,263 | Smith | May 4, 1943 |
| 2,354,113 | Gould | July 18, 1944 |
| 2,360,160 | Pickhaver | Oct. 10, 1944 |
| 2,427,350 | Carpenter | Sept. 16, 1947 |
| 2,437,782 | Hopkins | Mar. 16, 1948 |
| 2,592,414 | Gibson | Apr. 8, 1952 |
| 2,709,213 | Gibson | May 24, 1955 |
| 2,731,536 | Laur | Jan. 17, 1956 |

FOREIGN PATENTS

| | | |
|---|---|---|
| 25,132 | Great Britain | Nov. 4, 1914 |
| 548,365 | Great Britain | Oct. 7, 1942 |